Dec. 16, 1930.  J. R. RAY ET AL  1,785,530
METHOD OF CRYSTALLIZATION
Filed Jan. 18, 1928  4 Sheets-Sheet 1

Witness:
William P. Kilroy

Inventors
Joshua R. Ray
Thomas Ray

By Hill & Hill, Attys.

Dec. 16, 1930.  J. R. RAY ET AL  1,785,530
METHOD OF CRYSTALLIZATION
Filed Jan. 18, 1928    4 Sheets-Sheet 3

Witness:
William P. Kilroy

Inventors
Joshua R. Ray
Thomas Ray
By Hill & Hill Attys

Dec. 16, 1930.  J. R. RAY ET AL  1,785,530
METHOD OF CRYSTALLIZATION
Filed Jan. 18, 1928  4 Sheets-Sheet 4

Witness:
William R. Kilroy

Inventors
Joshua R. Ray
Thomas Ray
Hill & Hill Attys

Patented Dec. 16, 1930

1,785,530

UNITED STATES PATENT OFFICE

JOSHUA R. RAY AND THOMAS RAY, OF MANISTEE, MICHIGAN

METHOD OF CRYSTALLIZATION

Application filed January 18, 1928. Serial No. 247,541.

This invention pertains to a method of crystallization and particularly to a method capable of use in the manufacture of sugar.

An object of our invention is the production of a method which is of high efficiency, and which may be operated at low cost.

A further object of our invention is the production of a method in which circulation of the liquid is facilitated.

A further object of our invention is the production of a new method of crystallization of sugar in multiple effect.

Many other objects and advantages of the method herein shown and described will be obvious to those skilled in the art from the disclosure herein given.

In the drawings, wherein like reference characters indicate like or corresponding parts:

Figure 1:
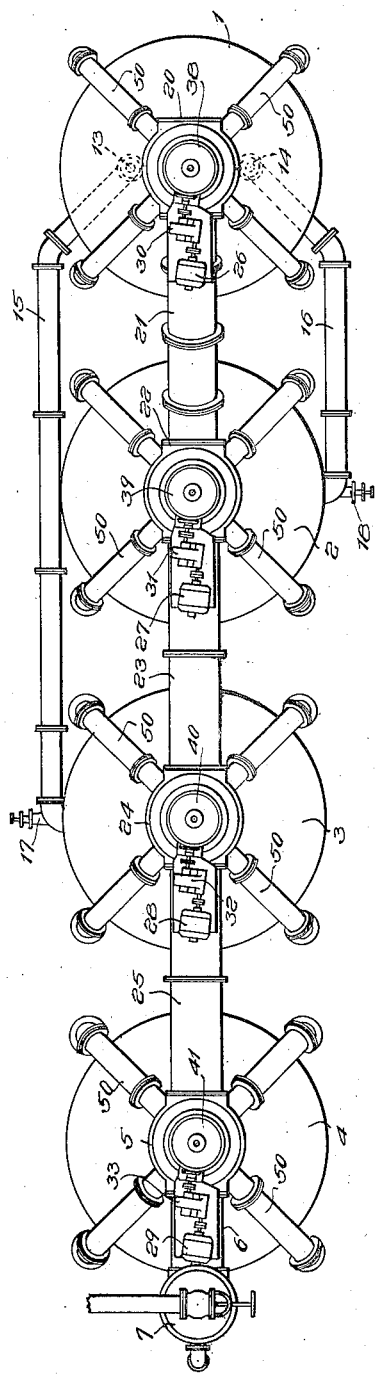
Fig. 1 is a top plan view of a device for crystallization of sugar showing evaporating pans in quadruple effect.
Figure 2:
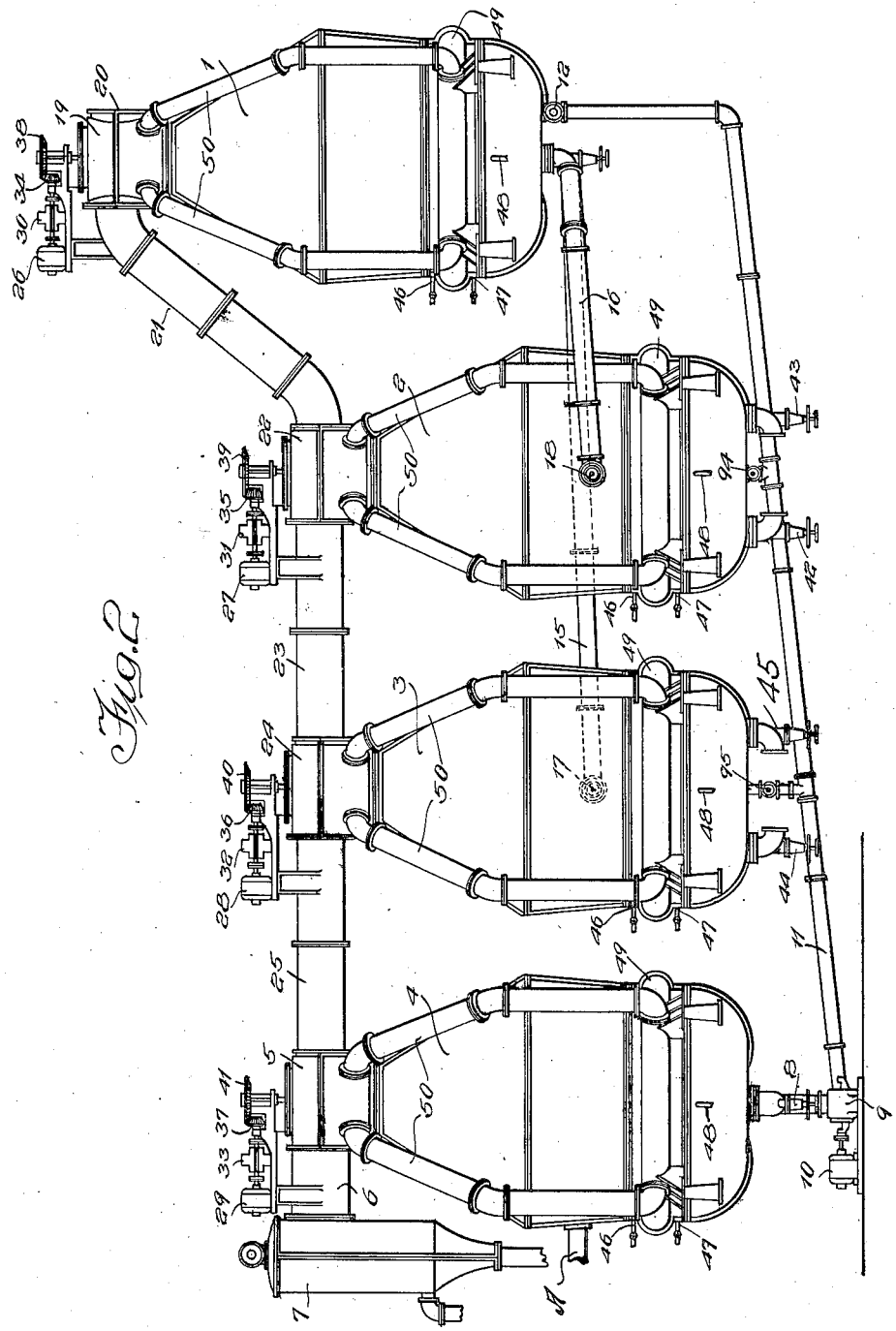
Fig. 2 is a side elevation thereof.

Referring now to Figs. 1 and 2, the vacuum pans shown in quadruple effect will be numbered consecutively from right to left as follows: 1, 2, 3 and 4. The particular construction of the individual pan employed in this invention will be hereinafter set forth. As will clearly appear as the specification proceeds, pan 4 is operated counter-current. The vapor generated within pan 4 by the evaporation of the liquid therein is led through a dome 5, the construction of which will be hereinafter set forth, through a suitable pipe 6 to a condenser 7. At the bottom of pan 4 is a suitable strike valve 8 which controls the flow of liquid from pan 4 to pump 9. Pump 9 is operated by suitable motor 10. Pump 9 discharges into pipe line 11 which leads to the bottom of pans 1, 2 and 3. At the entrance of pipe line 11 into pan 1 is a valve 12. In the bottom of pan 1 are suitable strike valves 13 and 14 which open into pipe lines 15 and 16, respectively. Pipe line 15 discharges into pan 3 and has a valve 17 at the entrance into pan 3. Pipe line 16 discharges into pan 2 and has a valve 18 at the entrance into pan 2. These entrances are above the liquor level to which pans 2 and 3 will be filled so that these pipes will drain before starting evaporation. Before evaporation, all four valves are closed. At the top of pan 1 and in the dome is an entrance for steam 20. Steam entering at 20 is conducted to the calandria of pan 1 by virtue of a novel dome arrangement, the construction of which will be hereinafter set forth. The vapor generated within the pan 1 by the boiling of the liquid therein is conducted by pipe line 21 to dome 22 of pan 2 from whence it is conducted to the calandria thereof. The vapor generated in pan 2 is conducted by pipe line 23 to dome 24 of pan 3 from whence it is conducted to the calandria thereof. The vapor generated in pan 3 is conducted by suitable pipe line 25 to dome 5 of pan 4 from whence it is conducted to the calandria thereof by means which will be hereinafter set forth. Domes 5, 24, 22 and 19 are of similar construction. Suitably mounted above the pans 1, 2, 3 and 4 are motors 26, 27, 28 and 29, respectively, which are connected by means of reduction gears 30, 31, 32 and 33 to pinions 34, 35, 36 and 37, respectively. Pinions 34, 35, 36 and 37 mesh with bevel gears 38, 39, 40 and 41. Each of said bevel gears is attached to a separate shaft. Each shaft operates circulating apparatus within the pans as will be hereinafter set forth. Any equivalent driving mechanism for the circulators may be employed. At the bottom of pan 2 are strike valves 42 and 43. At the bottom of pan 3 are strike valves 44 and 45. At 46 and 47 on each of the pans 1 to 4, inclusive, are shown connecting means for apparatus for withdrawing non-condensable gases from within the steam chamber of the calandria. At 48 is shown means for removing condensation liquid from the steam chamber. About the calandria of each of the pans 1, 2, 3 and 4 is a ring pipe 49. Each ring pipe 49 is connected to the dome of the particular pan of which it forms a part by a plurality of pipes 50. In the form shown, the pipes 50 are four in number for each pan.

Figure 3:
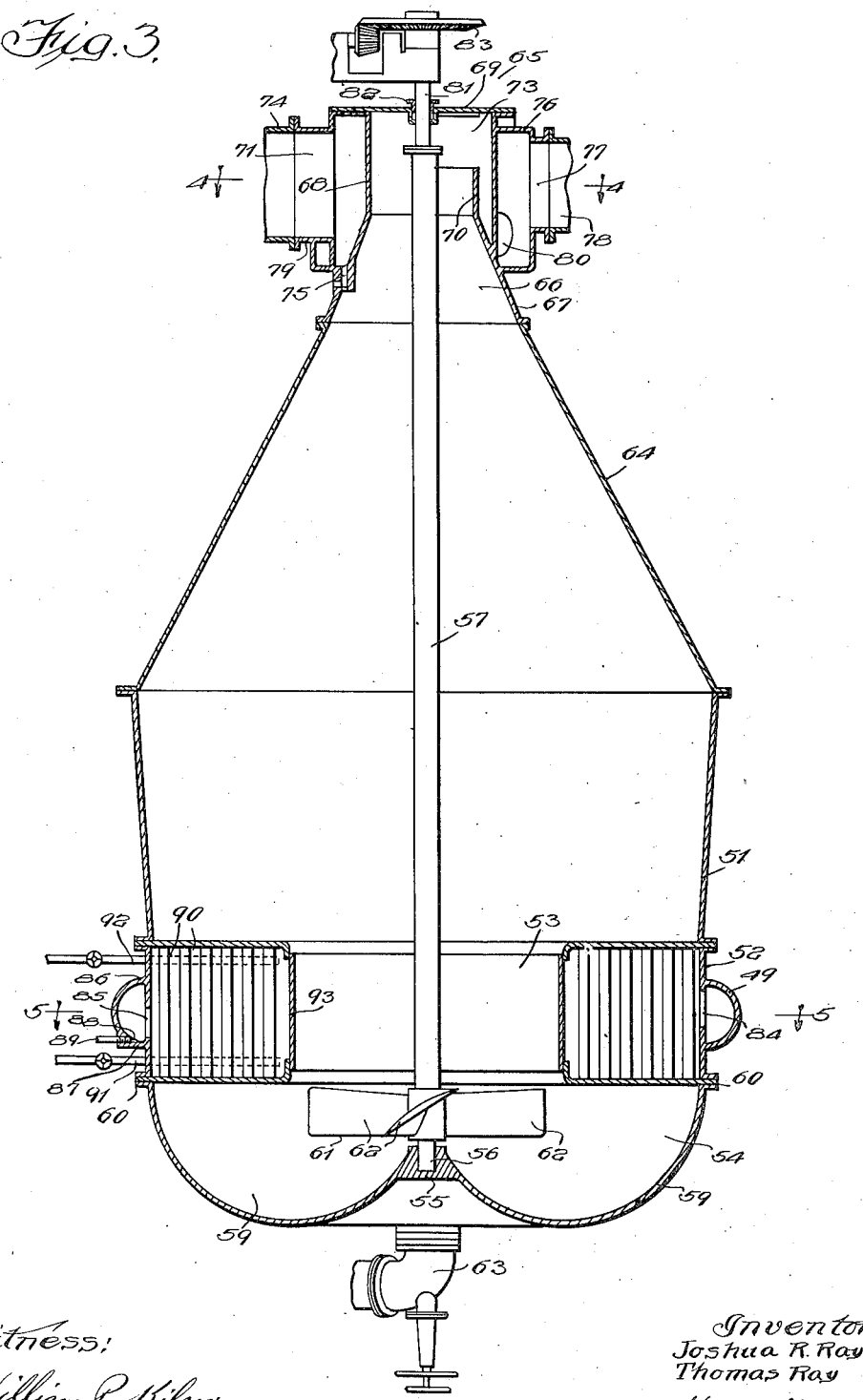
Fig. 3 is a sectional elevation of a single evaporating pan.
Figure 4:
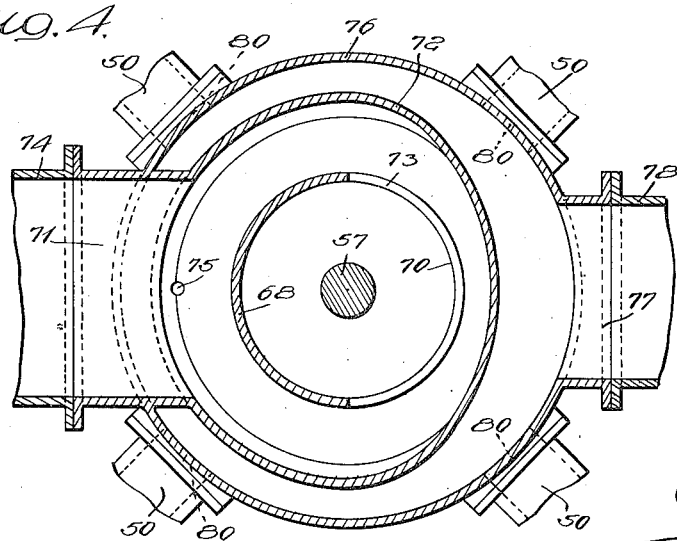
Fig. 4 is a section taken on line 4—4 of Fig. 3.

Referring now to Fig. 3 in which is shown a sectional elevation of the preferred form of vacuum pans 51 is an intermediate section of the side wall thereof. Section 51 is connected to the outer upper edge of the calandria 52. Calandria 52 is of the vertical tube type preferably circular in form and circumscribes a circular downflow or well 53 at its center. Steam is led to the interior of calandria 52 by means of ring pipe 49 to which are connected pipes 50. Beneath calandria 52 and at the outer edge thereof is connected the bottom 54 of the pan. The bottom 54 of the pan has a raised portion 55 at its center which provides a bearing for the end 56 of the circulator shaft 57. The raised portion 55 extends upward in the center of the pan a considerable amount in order to form an annular trough 59 of arcuate cross section. The trough 59 extends downward from portion 55, then outward and upward meeting the bottom of the calandria 52 and is connected thereto at 60. It is thus seen that the bottom 54 of the pan is formed annularly about the elevation 55, a cross section of said annular portion being arcuate. Attached to the circulator shaft 57 directly above the raised portion 55 is circulator 61 with a plurality of blades 62. At the bottom of the pan is shown a strike valve 63. The number of outlets and strike valves in the bottom of the pan is a matter of choice according to the particular installation. Above wall section 51 and attached thereto is a frusto-conical wall section 64 converging upwardly and connecting at its upper end with the bottom of dome 65. Dome 65 has an inner bonnet portion 66 which forms a part of a catch-all or separator. Bonnet 66 is preferably formed of a frusto-conical portion 67 converging upwardly, at the top of which is a portion 68 of uniform diameter. The portion 68 extends upward and meets the top 69 of the dome 65 except for the side 70 remote from opening 71, which side 70 is cut away as clearly illustrated in Figs. 3 and 4, thereby forming an opening 73. Spaced from the outer circumferential surface of the portion 68 and extending downward and meeting the outer surface of the frusto-conical portion 67 of the bonnet 66 and extending upward and meeting top plate 69 is a wall 72, the preferred cross section of which is clearly illustrated in Fig. 4. Wall 72, however, may have a circular cross-section. In the side of wall 72 remote from the opening 73 in the bonnet 66 is the opening 71 heretofore referred to. Opening 71 makes a suitable connection with a pipe 74 which is identical with pipes 21, 23 and 25 heretofore referred to in the description of Fig. 2 and is for the purpose of leading away vapors formed by the evaporation of liquid in the pan. The vapors in the pan ascend through the bonnet 66, escape through the opening 73, pass around the outside of bonnet 66 in the spaces between the bonnet 66 and wall 72, then out through the opening 71 and into pipe 74. Any moisture which has become entrained in the vapor is dropped or separated from the vapor as it passes up through the bonnet 66 and out around the outside thereof. Thus, bonnet 66, wall 72 and parts thereof form an effective catch-all or separator for all moisture entrained in the vapor. Channel 75 formed in the bottom of the catch-all serves as means to remove the liquids due to the condensation of the vapor. Surrounding wall 72 is a steam manifold 76 with entrance 77 to which is connected pipe 78. Pipe 78 is identical with the discharge end of pipes 21, 23 and 25 or the steam supply pipe connected to opening 20, all of which has been heretofore described with reference to Fig. 2. Manifold 76 circumscribes wall 72, passes under and is integral with the under surface 79 of opening 71 as clearly shown in Fig. 3. As shown, manifold 76 has a plurality of openings 80 to which are connected pipes 50 which conduct the steam or heating vapor to the ring pipe 49 adjacent the calandria 52. Circulator shaft 57 extends vertically upward through the pan and an extension 81 thereof passes upward through top plate 69. A suitable stuffing box 82 makes a tight connection between shaft 81 and plate 69. At the end of shaft 81, is attached bevel gear 83 which is identical with bevel gears 38, 39, 40 and 41 heretofore referred to in the description of Fig. 2.

By means of the arrangement of parts at the bottom of the vacuum pan, a very thorough and complete circulation of the liquid therein is obtained, the annular trough about the raised portion 55 being of arcuate cross section and its particular relation with respect to the circulator 61 and the calandria 52 places all of the liquid within the evaporator in circulation. The inclined blades 62 of the circulator 61 produce circulation. Circulation is also augmented by the heating of the liquid in the tubes of the calandria 52, same passing upward therethrough and downward through the well 53, then through the circulator 61 and forced by the circulator 61 downward into the arcuate bottom of the annular trough, then upward at the outer annular edge of the trough and upward through the tubes of the calandria 52. By means of this arrangement, all of the liquid is placed in circulation and the speed of the circulation can be regulated by means of the motor driving circulator shaft 57.

Figure 6:
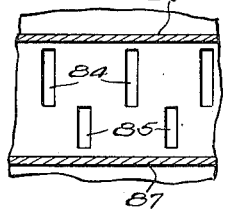
Fig. 6 is a fragmentary section taken on line 6—6 of Fig. 5.
Figure 5:
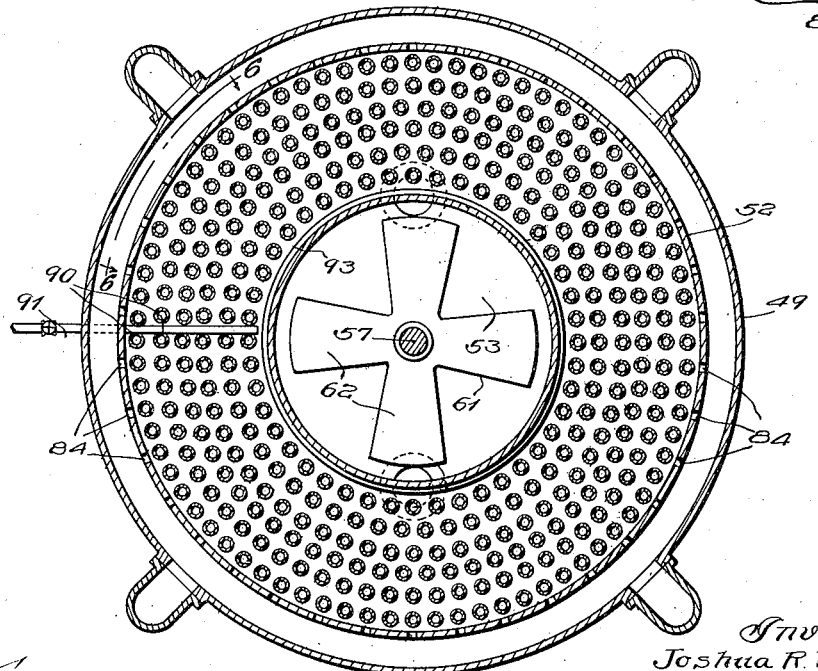
Fig. 5 is a section taken on line 5—5 of Fig. 3.

As shown in Fig. 6, the outer wall of calandria 52 within the ring pipe 49 is provided with annular rows of slots 84 and 85. The slots 84 extend downward from the upper wall 86 of the ring pipe 49 and terminate approximately half-way between the inter-sections of the upper wall 86 and lower wall 87 of ring pipe 49 with the outer wall of calandria 52. The slots 85 are preferably staggered with respect to slots 84 and begin at approximately the mid-point above referred to and extend downward. Slots 85 are spaced from the bottom or lower wall 87 of ring pipe 49 as clearly shown in Fig. 6. The purpose of this latter provision is to prevent liquid condensed in ring pipe 49 from reaching the heating chamber 90 of the calandria. The condensed liquid is drawn off at the bottom of ring pipe 49 through outlet 88 in which pipe 89 is threaded. A plurality of outlets 88 are preferably provided. Non-condensable gases are drawn off from heating chamber 90 through pipes 91 and 92 which preferably extend through to adjacent the inner wall 93 of calandria 52.

In the description, the manufacture and treating of sugar is particularly referred to. However, it is obvious that other products may be manufactured by the same process or apparatus. Therefore, in the specification and claims wherein the term "sugar" is used, it is understood that same includes not only sugar, but any other product and the liquor of which it is made.

The operation of the quadruple effect when used in the crystallization of sugar is as follows: Liquid is pumped into the pan 4 by means of a pump (not shown) connected with the pipe A and evaporation or concentration of the liquid proceeds. The temperature of pan 4 is approximately 100° Fahrenheit preferably. Considerable evaporation and heating of the liquid takes place in pan 4. However, the pre-heating and pre-concentration in pan 4 is insufficient to form crystals to any appreciable extent. When the liquid has become concentrated to the desired point in pan 4, the strike valve 8 is opened and the liquid pumped by means of pump 9 and motor 10 and pipe line 11 into pan 1. Valve 12 at the bottom of pan 1 is open during the pumping operation and is closed when the pan 1 is filled somewhat above the flue sheet. The temperature of the pan 1 is in the preferred form in the neighborhood of approximately 190° Fahrenheit. The liquid in pan 1 is concentrated and minute sugar crystals are formed in the liquid therein. When the crystallization has proceeded in pan 1 to the desired extent, strike valve 12 is opened and liquid from pan 4 is slowly and preferably continuously pumped into pan 1. The liquid in pan 1 is preferably kept slightly above saturation. New crystals are thus formed continuously until pan 1 is full. The liquid which is now laden with minute sugar crystals is then withdrawn from pan 1 by what is known as a cut strike through strike valves 13 and 14 and pipe lines 15 and 16, respectively. Valve 17 adjacent pan 3 is opened as well as valve 18 adjacent pan 2. One-half of the liquid from pan 1 enters pan 3 while the other half from pan 1 enters pan 2. When pan 1 is empty, strike valves 13 and 14 are closed. When pipe lines 15 and 16 are drained, valves 17 and 18 are closed. The process in pan 1 as above described is repeated with new liquid from pan 4. The liquid delivered to pans 2 and 3 now has minute crystals formed therein. The purpose of pans 2 and 3 is not to increase the number of crystals to any appreciable extent but the function of pans 2 and 3 is to build up the size of the crystals already formed in pan 1. It will be noted that all of the pans of the quadruple effect are preferably furnished with circulators which increase circulation. These circulators are particularly effective in all of the pans. In pans 2 and 3 the liquid is further evaporated. However, fresh liquid from pan 4 is supplied preferably continuously through valves 94 and 95 in pans 2 and 3, respectively. The liquid in pans 2 and 3 is kept at or slightly below saturation preferably. No new crystals are formed in pans 2 and 3 to any extent preferably, but the crystals already formed previously in pan 1 are built up or in other words increased in size. When the crystals have reached the desired size, the contents of pan 3 are drawn off through strike valves 44 and 45, and the contents of pan 2 are drawn off through strike valves 42 and 43. It will be noted that pan 4 is operated counter-current, serving to pre-heat and pre-evaporate the liquid, thereby preparing the liquid for the crystallization in pan 1. This particular arrangement of a quadruple effect is very effective for its intended purpose. It will be obvious to persons skilled in the art and familiar with our invention that the size of the crystals may also be built up somewhat in pan 1 by proper regulation if desired.

A superior grade of hard sugar can be made by our novel method, regardless of the temperature in the respective pans. The temperature in pans 1, 2, 3 and 4 is preferably in the neighborhood of 190°, 160°, 130° and 100° F., respectively. However, the temperature in each pan may be varied to suit practice. Due to the thorough circulation which is produced by the pan construction and circulator therein, a high temperature in a pan to form a high grade of hard sugar is not necessary. This is due to the means of thorough circulation which is produced by the arrangement of parts. Furthermore, inasmuch as vapor formed in the liquid is readily released due to circulation of all the contents each pan can operate at a relatively lower temperature and the entire multiple effect with a lower consumption of heating vapor. The particular quadruple effect shown in the drawings operates satisfactorily with two pounds per square inch of steam applied to the calandria of pan No. 1. With many types of crystallizing apparatus employing quadruple effect and even in those employing one pan only, sixty to eighty pounds per square inch steam pressure is required on the first pan. It is thus seen that the apparatus not only is economical in the consumption of heating vapor, but also produces a high grade product. Furthermore, due to the fact that thorough and complete circulation is produced in this pan, the pan can be made in any size, large or small.

Having thus described our method, it is obvious that the method may be employed for uses other than for producing sugar and that various immaterial modifications may be made in the devices described for accomplishing the method; hence we do not wish to be understood as limiting our invention to the exact form, construction, arrangement and combination of parts herein shown and described, or uses mentioned.

What we claim as new and desire to secure by Letters Patent is:

1. A method of crystallizing sugar in multiple effect comprising partially filling an evaporating pan with liquor, then evaporating to a grain, then slowly feeding more of said liquor to said evaporating pan, keeping said liquor in said evaporating pan super-saturated, then making a cut strike into a plurality of associated evaporating pans of said multiple effect, then feeding said second-mentionel pans with fresh liquor, keeping the liquid inside the second-mentioned pans below saturation.

2. A method of crystallizing sugar in multiple effect comprising partially filling an evaporating pan with liquor, then evaporating to a grain, then slowly feeding more of said liquor to said evaporating pan, keeping said liquor in said evaporating pan saturated whereby graining is continued, then making a cut strike into two associated evaporating pans of said multiple effect, then feeding said second-mentioned pans with fresh liquor, keeping the liquid inside the second-mentioned pans approximately up to saturation whereby the crystals in said second-mentioned pans are built up.

3. A method of crystallizing a suitable liquor in multiple effect comprising partially filling an evaporating pan with liquor, circulating said liquor and concentrating to a desired extent, then slowly and continuously feeding more of said liquor to said pan, concentrating and circulating same until said pan is filled with liquor laden with crystals, then making a cut strike into a plurality of associated evaporating pans, then slowly and continuously feeding liquor to said second-mentioned pans and concentrating and circulating the contents of said second-mentioned pans.

4. A method of crystallizing sugar in multiple effect comprising partially filling an evaporating pan with liquor, circulating said liquor and evaporating to a grain, then slowly feeding more of said liquor to said pan, evaporating and circulating same until said pan is filled with liquor laden with sugar crystals, then making a cut strike into two co-operatively associated evaporating pans, then slowly feeding liquor to said second-mentioned pans and evaporating and circulating the contents of said second-mentioned pans whereby the size of the crystals in said second-mentioned pans is materially increased.

5. A method for crystallizing sugar in quadruple effect comprising pre-evaporating the liquor in the fourth effect, feeding said liquor to the first effect and partially filling same, circulating and evaporating the liquor in said first effect until it begins to grain, then continue feeding liquor slowly from said fourth effect to said first effect, then stopping feeding to said first effect, and making a cut strike into the second effect and the third effect, then circulating and evaporating in said second and third effects, and feeding liquor slowly from said fourth effect to said second and third effects.

6. A method of treating a suitable liquor in quadruple effect comprising pre-concentrating the liquor in the fourth effect, feeding said liquor to the first effect and partially filling same, circulating and concentrating the liquor in said first effect to a desired extent, then feeding liquor slowly and continuously from said fourth effect to said first effect and maintaining a desired degree of saturation, then closing the feeding valve to the first effect and making a cut strike into the second effect and the third effect, then circulating and further concentrating in said second and third effects, and feeding liquor slowly and continuously from said fourth effect to said second and third effects, and maintaining a desired degree of saturation in said second and third effects.

7. In the manufacture of sugar or similar substances, the method of first concentrating a suitable liquor to a desired degree by evaporation at a desired pressure and temperature, thence further concentrating the liquor to a point where the same begins to grain by evaporation at a greater temperature and pressure, thence adding more liquor slowly, thence dividing said liquor into a plurality of masses, thence further concentrating said masses at temperatures and pressures intermediate said first and second named temperatures and pressures and slowly adding liquor from said first-named concentration to said masses.

8. In a quadruple effect of the kind described, means for transferring liquid from the fourth effect to the first, second and third effects, valves in said means at each of said effects, means for discharging said first effect into said second and third effects by gravity flow, valves in said last-mentioned means located at each of said first, second and third effects, means for circulating the liquid in each of said effects, means for utilizing the vapor generated in said first effect to heat said second effect, means for utilizing the vapor generated in said second effect for heating said third effect, means for utilizing the vapor generated in said third effect for heating said fourth effect, and a condenser for condensing the vapor generated in said fourth effect.

9. A method of crystallizing sugar in multiple effect comprising partially filling an evaporating pan with liquor, then evaporating a grain, then slowly feeding more of said liquor to said evaporating pan, then making a cut strike into a plurality of associated evaporating pans of said multiple effect, and feeding the second mentioned pans with fresh liquor.

In testimony whereof, I have hereunto signed my name.

THOMAS RAY.

In testimony whereof, I have hereunto signed my name.

JOSHUA R. RAY.